United States Patent
Hajian et al.

(10) Patent No.: US 7,206,073 B2
(45) Date of Patent: Apr. 17, 2007

(54) DISPERSED FOURIER TRANSFORM SPECTROMETER

(75) Inventors: Arsen R. Hajian, Washington, DC (US); J. Thomas Armstrong, Silver Spring, MD (US); David Mozurkewich, Seabrook, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 341 days.

(21) Appl. No.: 10/750,633

(22) Filed: Dec. 22, 2003

(65) Prior Publication Data
US 2004/0201850 A1    Oct. 14, 2004

Related U.S. Application Data

(60) Provisional application No. 60/435,760, filed on Dec. 20, 2002.

(51) Int. Cl.
*G01B 9/02* (2006.01)
(52) U.S. Cl. ...................................... 356/451
(58) Field of Classification Search ................ 356/73, 356/328, 451, 456; 250/339.07, 339.08
See application file for complete search history.

(56) References Cited

U.S. PATENT DOCUMENTS 6,351,307 B1 *  2/2002  Erskine ....................... 356/451

FOREIGN PATENT DOCUMENTS

GB          2317446 A  *  3/1998

\* cited by examiner

*Primary Examiner*—Hwa (Andrew) Lee
(74) *Attorney, Agent, or Firm*—John J. Karasek; L. George Legg

(57) ABSTRACT

A dispersing Fourier Transform interferometer (DFTS) includes a Fourier Transform Spectrometer having an input for receiving a source light and an output, and a dispersive element having an input coupled to the Fourier Transform Spectrometer output and an output for providing the resulting multiple narrowband interferogram outputs of different wavelengths representative of the source light input. A processor applies a sparse sampling algorithm for determining the best fit between a set of model interferograms and the set of data interferograms. The model interferogram is inferred as specified at a discrete set of lags, a difference is determined between the model interferogram and the data interferogram, and an optimization method determines the model interferogram best matched to the data interferogram. The DFTS interferometer improves the sensitivity of a standard FTS by including a dispersive element, increasing the SNR by a factor of $(R_g)^{1/2}$ as compared to the FTS, where $R_g$ is the resolving power of the conventional dispersing spectrometer (i.e. $R_g = \lambda/\Delta\lambda$).

33 Claims, 5 Drawing Sheets

US 7,206,073 B2

DISPERSED FOURIER TRANSFORM SPECTROMETER

The present application claims the benefit of the priority filing date of provisional patent application No. 60/435,760, filed Dec. 20, 2002, incorporated herein by reference.

FIELD OF THE INVENTION

This invention relates to a method and device for Fourier transform spectrometry. More particularly, the invention relates to a spectrally dispersed Fourier Transform Spectrometer.

BACKGROUND OF THE INVENTION

The technique of spectrometry is used widely to determine spectra either occurring in nature or in laboratory settings. Recent advances have provided significant improvements in spectrometric applications such as astronomical spectrometry. Prior to 1980, measurements of Doppler velocity shifts providing velocity precisions on the order of 1 km s$^{-1}$ were seldom possible. Now, using high precision absorption-cell spectrometers, measurement of velocities with precisions as small as 1 m s$^{-1}$ are attainted. These data make possible the detection of planetary companions to stars on the order of $0.16 M_J < M \sin(i) < 15 M_J$ ($M_J$ is the mass of Jupiter, and i is the inclination angle of the orbit of the planetary companion). It would be desirable, however, to obtain a greater sensitivity capability to detect smaller companions or to provide greater sensitivity in other types of non-astronomical applications.

Another available technique is Fourier Transform Spectrometry (FTS). An FTS spectrometer is an autocorrelation, or time-domain, interferometer. The theoretical basis was laid at the end of the 19th century (Michelson, A. A. 1891, Phil. Mag., 31, 256, Michelson, A. A. 1892, Phil. Mag., 34, 280.), but FTSs did not achieve widespread use until approximately 75 years later (Brault, J. W. 1985, in High Resolution in Astronomy, 15th Advanced Course of the Swiss Society of Astrophysics and Astronomy, eds. A. Benz, M. Huber and M. Mayor, [Geneva Observatory: Sauverny], p. 3.).

Fellgett described the first numerically transformed two-beam interferogram and applied the multiplex method to stellar spectroscopy (Fellgett, P., J. de Physique et le Radium V. 19, 187, 236, 1958). Fellgett employed a Michelson-type interferometer 10 as shown in FIG. 1, wherein the incoming beam of light B is divided into two beams $B_1$ and $B_2$ by a beamsplitter ("beam divider") 12. $B_1$ is reflected from retro reflector 14, while $B_2$ is reflected from retroreflector 16. As shown, beams $B_1$ and $B_2$ follow separate paths whose lengths can be precisely adjusted by delay lines (DLs) established by repositioning one or both of reflectors 14 and 16, as shown with reflector 16 connected to drive train 18 and drive motor 20. The beams, now with a path difference x (i.e. the "lags"), are recombined at beamsplitter 12 and focused by a concave mirror 22 onto a detector 24, producing an interferogram I(x), where $$I_d(x_i) = \int_{s_{min}}^{s_{max}} ds\, J_t(s)\cos(2\pi x_i s), \quad (1),$$

as is discussed in more detail below. A mirror 28 is provided for an optional reference beam indicated in FIG. 1 by the dotted lines. The reference beam is divided into two beams at the beamsplitter 12. These two beams are reflected from the retroreflectors 14 and 16, are recombined at 12 and focused by 22 onto the detector 24. The reference beam allows the user to align the optics as well as to determine the zero-path position of the DLs, i.e., the position of retroreflectors 14 and 16 for which the path difference x=0. In this manner, the reference beam thereby measures the delay, that is, the path difference x, introduced by the delay lines. This provides a more accurate determination of the optical path differences in the interferometer, and is typically included in applications involving the precise determination of spectral lineshapes and Doppler shifts. The detector is output to an amplifier and demodulator 30, and then the interferogram corresponding to the input spectrum is output to a recorder 32.

The intensity of the combined beam is measured for a series of delay line positions. The wavelengths in the light beam cover a range from $\lambda_{min}$ to $\lambda_{max}$, i.e., centered on $\lambda_0$ and covering a range $\Delta\lambda = \lambda_{max} - \lambda_{min}$. The most important length parameter in the FTS is the lag, x, which is equal to the path length difference A–B. At any given wavelength $\lambda$, complete constructive interference between light from the two paths occurs when $x/\lambda$ is an integer, and complete destructive interference occurs when $x/\lambda$ is an integer plus ½.

When the paths A and B are precisely equal to within a small fraction of $\lambda_0$ (i.e., x=0 is the only delay for which $x/\lambda=0$ at all wavelengths), the light waves at all wavelengths in the two beams constructively interfere and the intensity I in the recombined beam is at its maximum, $I_{max}$. This position is known as the central fringe. As the DLs are moved and x changes, constructive interference between light waves from the two paths weakens, particularly at the shorter wavelengths, and I decreases. As the magnitude of x continues to increase, I reaches a minimum at $x/\lambda_0=½$ and then rises again to a new (but weaker) maximum at $x/\lambda_0=1$. This weakening oscillation of I continues as x increases. When $x/\lambda_0$ is increased to many times $\lambda_0/\Delta\lambda$, some wavelengths interfere constructively and some destructively, so I is close to the mean light level. Thus, if the observed spectral region is wide, there is only a small range of lag with large deviations from the mean level.

The resulting data set of intensity measurements, I(x), measured at many values of x is known as an interferogram (Equation 1) as discussed above. The region of x over which there are large deviations from the mean level is termed the fringe packet. An example of a typical interferogram is shown in FIG. 2. The wavelength of the high frequency oscillations is the central wavelength of the bandpass, $\lambda$. As shown, the number of fringes in the central fringe packet is approximately equal to $\lambda/\Delta\lambda$, where $\Delta\lambda$ is the bandwidth.

Typically, the interferogram is sampled in steps of $\lambda_0/2$, and is then Fourier transformed to produce a spectrum. The spectrum is given as a series of values at regularly spaced discrete values of the wavelength, $\lambda$. The spectrum that results from the Fourier transform of the interferogram contains artifacts of the PSF, which results from the finite lag range and the actual sampling of the interferometer. A wide range of deconvolution methods have been developed to disentangle the real signal from the deleterious effects of sampling, noise, etc., and have generally done so by implicitly modeling the spectrum as differing from zero only at discrete values of wavelength. The disadvantage of the deconvolution approaches is that they are highly nonlinear processes, so their behavior and uncertainties are hard to understand quantitatively. In addition, the disadvantage of modeling the spectrum only at discrete points is that the corresponding interferogram has significant sidelobes.

The resolution of the spectrum at a given wavelength, λ, is determined by the maximum value of x/λ and can be understood as follows. The light waves that comprise a narrow spectral line occupy only a small range of wavelengths, and thus stay correlated for a relatively long time, given roughly by δλ/c, where δλ is the range of wavelengths making up the line and c is the speed of light. Since the lag x corresponds to a time delay between beams of x/c, a narrow line produces interference fringes over a large range of x. The FTS can measure over only a finite range in x, so it cannot distinguish between a spectral line of width δλ and a narrower line that produces fringes over a larger range of x. For a spectral line wider than the resolution of the FTS, the width of a spectral feature is measured by the range of x over which there are interference fringes.

The most common type of spectrometer is a dispersing spectrometer, consisting of a dispersing element (usually a grating) and a camera equipped with an array of detectors (usually a CCD) for multiplexing the dispersed output. Present CCD designs allow the number of channels $N_{ch}$ to exceed several thousand, so that the entire integration time is directed to integrating on all $N_{ch}$ channels. Recent planetary detections have used dispersing spectrometers with an absorption cell positioned in the path of the incoming beam to impose a reference set of spectral lines of known wavelength on the stellar spectrum.

In principle, an FTS offers at least three major advantages over a dispersing spectrometer. First, the spectral resolution can be changed simply by changing the maximum value of the lag; second, the wavelength scale in the resulting spectrum is determined only by the delay line settings, while remaining insensitive to such effects as scattered light and flexure of the instrument; and third, the point spread function (PSF) of the spectrum can be determined to a high degree of precision.

An FTS, however, also suffers certain disadvantages. These include low sensitivity: a conventional FTS is essentially a single-pixel scanning interferometer, and high spectral resolution requires measurements at a large number of lag settings. Accordingly, FTSs are commonly used when sensitivity is not a paramount concern, such as with laboratory spectroscopy or solar observations, or when very high spectral resolution or accurate wavelength calibration is required, such as in observations of planetary atmospheres. Other applications of FTSs include FTIR, MRI, and fluorescence and Raman emission spectroscopy.

It would therefore be desirable to provide a spectrometer which offers the advantages of an FTS spectrometer while preserving most of the sensitivity of a dispersing spectrometer. It would also be desirable to provide an improved algorithm for recovering the spectrum from the interferogram with greater fidelity, with easily quantifiable error estimates, and without producing undesirable artifacts.

SUMMARY OF THE INVENTION

According to the invention, a dispersing Fourier Transformn Spectrometer (DFTS) interferometer includes a Fourier Transform Spectrometer having an input for receiving a source light and an output, and a dispersive element having an input coupled to the Fourier Transform Spectrometer output and an output for providing the resulting multiple narrowband interferogram outputs of different wavelengths representative of the source light input.

Also according to the invention, a method of determining a spectrum of a light source includes receiving and collimating a source light along a first optical path; transmitting a first part of the collimated source light further along the first optical path while reflecting a second part of the collimated source light along a second optical path; reflecting back the first part of the collimated source light along the first optical path; reflecting back the second part of the collimated source light along the second optical path; introducing a path length difference x between the first and second optical paths; recombining the back-reflected first and second parts of the collimated source light; dispersing the recombined beam into a plurality of different wavelengths; separately sensing an intensity I of each of the plurality of different wavelengths to thereby produce a set of data of interferogram intensities $I_d$ measured at a set of discrete lags $x_i$; and processing the data so as to produce a spectral output having a best fit with the set of data.

The data processing preferably includes applying a sparse sampling algorithm for determining the best fit between a model interferogram and the data interferogram. In one form, the sparse sampling algorithm processes the set of data interferograms, $I_d(x_i)$, where:

$$I_d(x_i) = \int_{s_{min}}^{s_{max}} ds\, J_t(s)\cos(2\pi x_i s), \quad (2)$$

s is the wavenumber, equal to the inverse of the wavelength, $J_t(s)$ is the true spectral intensity at wavenumber s, and the subscript t indicates that $J_t(s)$ is the truth spectrum and is an unknown, and the wavenumbers $S_{min}(n)$ and $S_{max}(n)$ span the range of wavenumbers detected by the $n^{th}$ member of said set of light intensity sensing elements. A model spectrum, $J_m(s_j)$, is selected, from which is inferred a model interferogram specified at a discrete set of lags $x_i$, $I_m(x_i)$; and a difference between the model interferogram and the data interferogram is determined, and an optimization method applied to determine a model interferogram best matched to the data interferogram $I_d(x_i)$.

The DFTS interferometer improves the sensitivity of a standard FTS by including a dispersive element, increasing the SNR by a factor of $(R_g)^{1/2}$ as compared to the FTS, where $R_g$ is the resolving power of the conventional dispersing spectrometer (i.e. $R_g=\lambda/\Delta\lambda$). The DFTS interferometer disperses the recombined light beam from the FTS module and focuses it onto a CCD detector, essentially splitting a single broadband FTS into $N_{ch}$ parallel, narrowband channels. A narrowband beam yields a spectrum with a higher signal-to-noise (SNR) ratio than a broadband beam because a narrowband beam filters out noise from wavelengths outside the bandpass without losing signal from inside the bandpass. The noise in the spectrum is a constant with a value proportional to the square root of the mean flux level in the entire interferogram, and restricting the bandpass and recording a narrowband interferogram filters noise from the spectrum without losing signal.

The DFTS interferometer obtains spectra over a wide bandpass, with an easily configurable spectral resolution that can be very high ($\lambda/\Delta\lambda > 10^6$), with high sensitivity (i.e., high spectral SNR), with a well-known PSF, and with high velocity/wavelength precision ($\delta\lambda/\lambda = \delta v/c \approx 10^{-9}$ using a standard frequency stabilized HeNe laser for metrology). The algorithm is a preferred embodiment that models the spectrum as a continuous function rather than as a series of infinitely narrow delta functions as is done in conventional spectral deconvolution, and it solves the forward problem, i.e., it selects the set of spectral intensities $J_m(s_j)$ that yields an interferogram $I_m(x_i)$ that best matches the measured interferogram $I_d(x_i)$.

The combination of the DFTS interferometer and the SSA provides more precise spectral measurements, a more precise position of the central fringe, and greater information about noise in the data.

Astronomical spectroscopy is one application of the DFTS interferometer. The detection of planets requires the acquisition of sensitive, high-resolution, high-stability spectra from their parent stars. The minute oscillations in the Doppler velocity of the star due to an orbiting planet have presented the most abundant signature of extrasolar planets to date. Jupiter-mass planets typically cause the lines in solar-type stars to be Doppler shifted by $\Delta\lambda_{shift}/\lambda \approx 10^{-8}$. The detection of earth-mass planets is made possible with the DFTS interferometer when precisions improve to better than 3 m/s.

The scope of other applications is broad. Spectroscopy is most commonly used to determine the composition of a sample. The desired spectral features are often faint and appear over a broad spectral range. The DFTS interferometer is ideal for such applications since the desired spectral regions can be isolated for maximum sensitivity. Precise knowledge of the PSF afforded by the DFTS interferometer can permit the identification of weak features juxtaposed to or superposed on intense background features, a capability owing to the FTS instrumentation component.

Additional applications of the invention include but are not limited to manufacturing and product quality control, field detectors for hazardous compounds, Raman spectroscopy, radar detection algorithms, and atmospheric and metallurgic spectroscopy.

Additional features and advantages of the present invention will be set forth in, or be apparent from, the detailed description of preferred embodiments which follows.

DETAILED DESCRIPTION OF THE INVENTION

Definition: The term "optics" as used herein when referring to a component of an interferometer of the invention includes a lens or a mirror.

Figure 1:
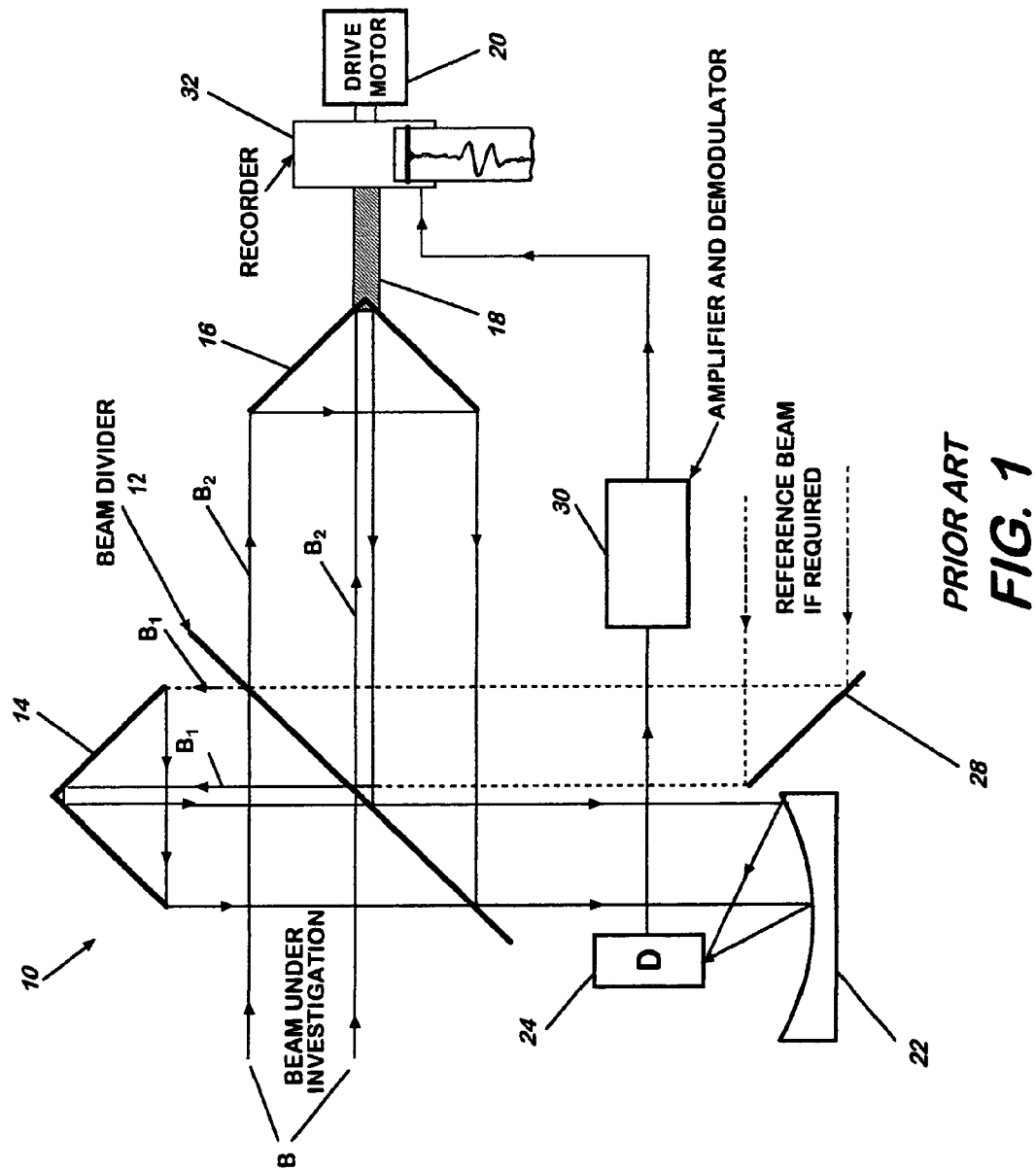
FIG. 1 is a schematic diagram of a prior art interferometer.
Figure 2:
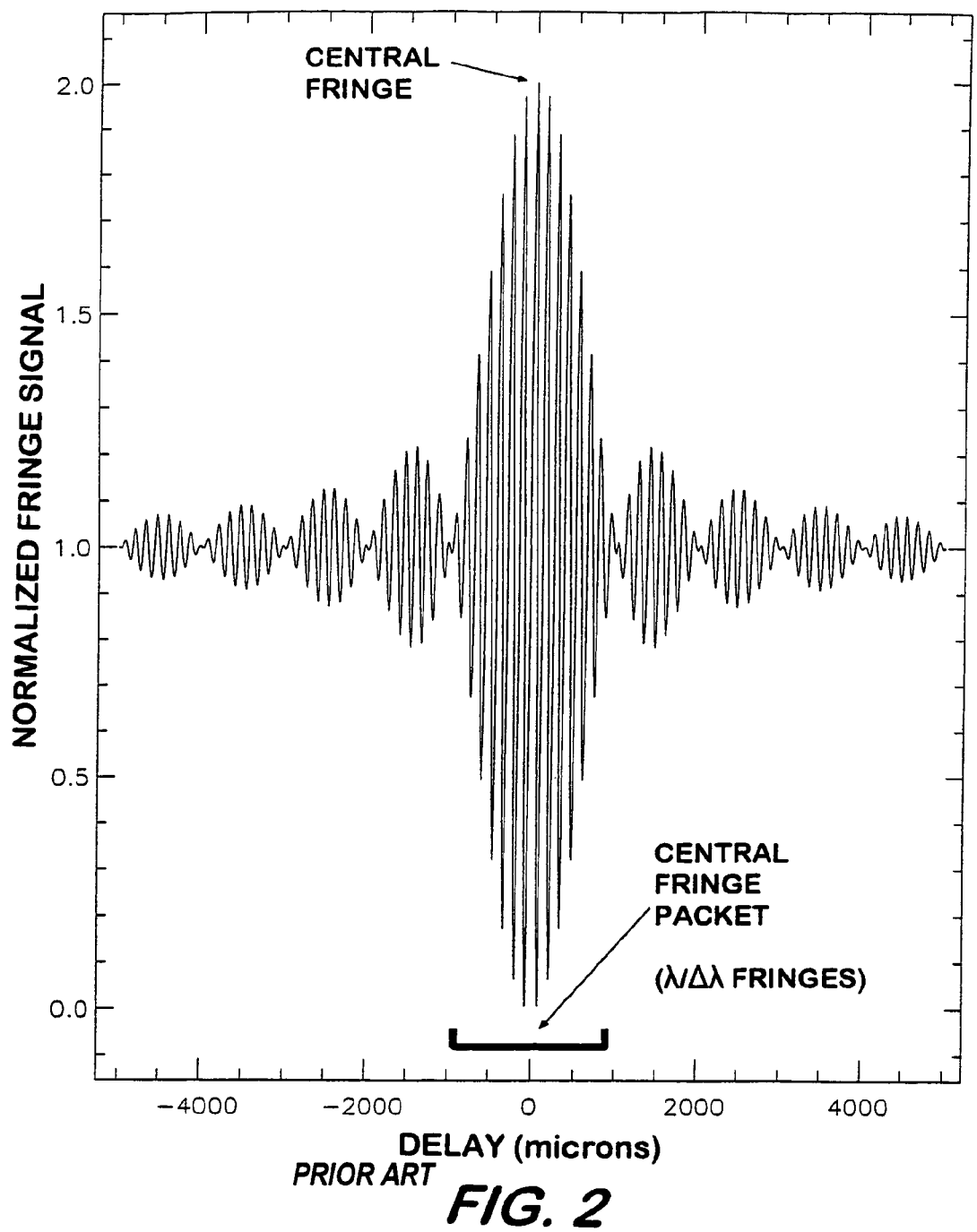
FIG. 2 is a graph showing a representative conventional interferogram.
Figure 3:
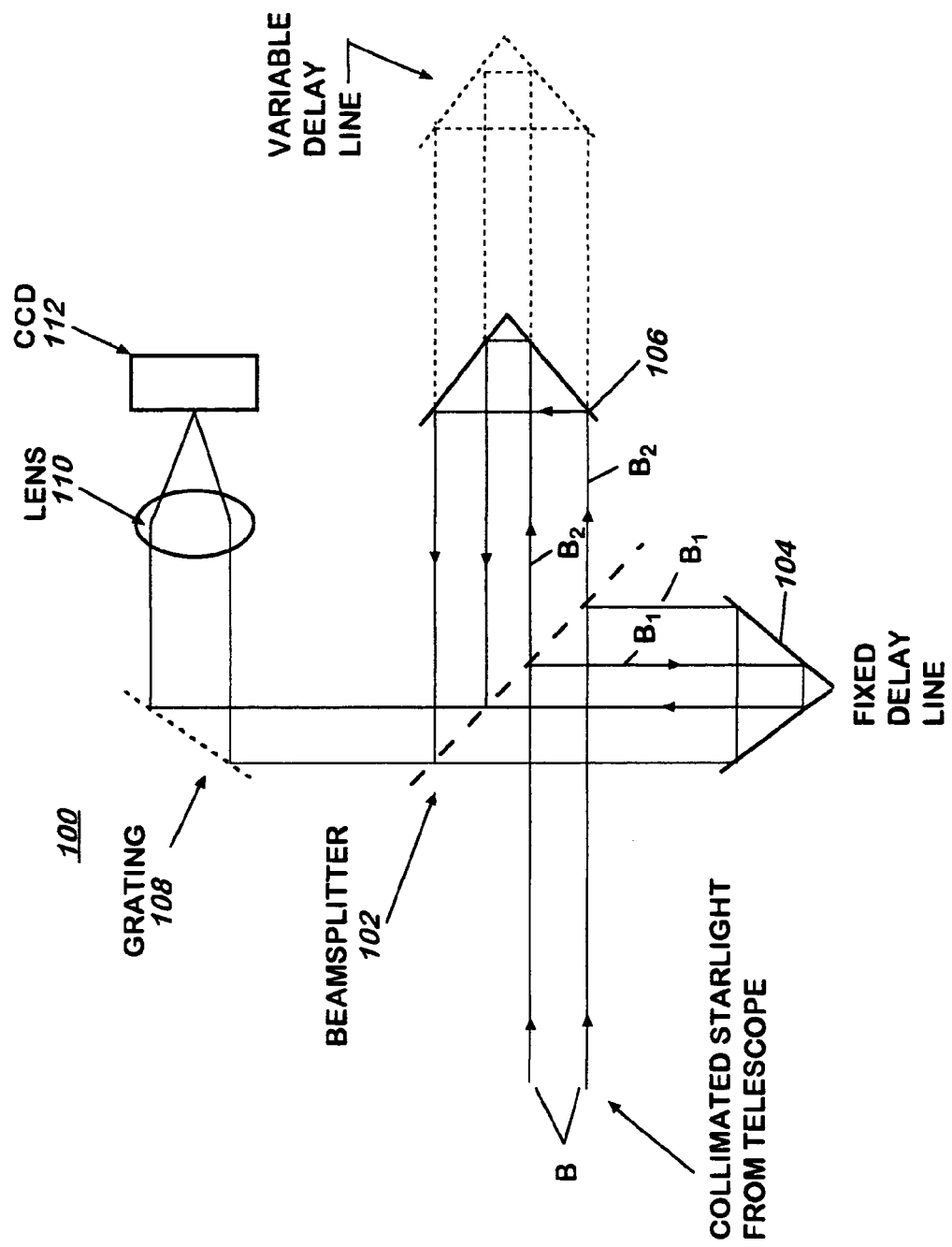
FIG. 3 is a schematic diagram of a DFTS interferometer according to the invention.

Referring now to FIG. 3, a DFTS interferometer 100 includes a beamsplitter 102 that partially reflects and partially transmits an input light beam B, splitting it into reflected beam $B_1$ along a first optical path and transmitted beam $B_2$ along a second optical path. $B_1$ is reflected from a first retroreflector 104 back to the beamsplitter 102, while $B_2$ is reflected from a second retroreflector 106 back to beamsplitter 102. As discussed above with respect to FIG. 1, the paths of either or both of $B_1$ and $B_2$ can be adjusted, such as is shown with respect to $B_2$ where a programmable drivetrain such as that illustrated in FIG. 1 is coupled to reflector 106 and thus introduce a path difference x between the first and second optical paths. Beams $B_1$ and $B_2$ recombine at beamsplitter 102 and due to path difference x produce an interferogram the properties of which are dependent on the spectral content of the incident input light beam B and on the optical path difference x.

Unlike a conventional FTS that would then focus the light on a detector, the light from recombined beams $B_1$ and $B_2$ is then directed onto a dispersing grating 108 to separate the beam into a plurality of channels differing in wavelength as is further described below. As illustrated in FIG. 3 for a single channel, the light from each narrowband channel is focused by a lens 110 onto a detector, CCD 112. By dispersing the recombined light beam from the FTS module and focusing it onto a CCD detector, the DFTS interferometer splits a single broadband FTS output into $N_{ch}$ parallel, narrowband channels. A narrowband beam yields a spectrum with a higher signal-to-noise (SNR) ratio than a broadband beam because, unlike a conventional FTS spectrometer, the noise at any given wavelength in the spectrum is not proportional to the square root of the signal level. The noise in the spectrum is a constant with a value proportional to the square root of the mean flux level in the entire interferogram, and restricting the bandpass and recording a narrowband interferogram filters noise from the spectrum without losing signal. The DFTS interferometer realizes an increase in the SNR by a factor of $(R_g)^{1/2}$ as compared to a conventional FTS. This can be shown as follows. Consider a telescope collecting a stellar flux of W photons $s^{-1}$ $nm^{-1}$ (we have expressed W using units of wavenumber instead of wavelength). An interferogram with measurements at $N_{lag}$ delays is obtained with a mean level of $W\, t_{lag}\, \Delta s$ photons per lag for a given spectral channel, where $\Delta s = s/R_g$ is the bandwidth of the channel, and $t_{lag}$ is the integration time at each delay. In the following analysis, we consider the data from a single spectral channel. Since the integral of the spectral intensities over the total spectral bandwidth is equal to the intensity, $I_o$, at the peak of the central fringe of the interferogram the mean spectral intensity (i.e., the mean signal level of the spectrum) is just $I_o$ divided by the spectral bandwidth. Assuming that the fringe contrast is 100%, then $I_o$ is just equal to the mean level of the interferogram, and the mean spectral intensity is:

$$S_S = W t_{lag}, \qquad (3)$$

On average, the noise level in the interferogram is determined according to Poisson statistics:

$$\sigma_I = \sqrt{W t_{lag} \Delta s}. \qquad (4)$$

Parceval's Theorem states that the total noise power in the spectral and lag domains is equal:

$$\sigma_S = \sigma_I \sqrt{\frac{\Delta x}{\Delta s}} \qquad (5)$$

where $\sigma_S$ is the average spectral noise power per pixel, and $\sigma_I$ is the average noise power in the interferogram per pixel. We combine the above equations to compute the signal-to noise ratio in the spectrum:

$$SNR_S = \sqrt{\frac{Wt_{lag}s}{R_{FTS}}}. \quad (6)$$

Not surprisingly, the number of samples in the interferogram ($N_{lag}$), is directly proportional to the number of independent spectral values, M, across one channel:

$$M = \frac{R_{FTS}}{R_g} = \frac{2N_{lag}}{\gamma}, \quad (7)$$

and Equation 6 becomes:

$$SNR_S = \sqrt{\frac{2Wt_{lag}N_{lag}s}{\gamma R_{FTS}M}}. \quad (8)$$

For the case of the conventional FTS, $R_g=1$.

Since the width of the central fringe packet is inversely proportional to M, small values of M mean that meaningful signal is collected throughout a larger portion of the interferogram. A large value of M suggests a narrow fringe will be the only region in the interferogram that has significant signal. In effect, M serves to dilute the signal as the fringes decorrelate. Equation 8 demonstrates that $SNR_S$ is directly proportional to $(R_g)^{1/2}$ for a constant integration time ($t_{lag} N_{lag}$), source brightness (W), observing wavenumber (s), and spectral resolving power ($R_{FTS}$). Sensitivity is gained with greater multiplexing.

FIG. 3 illustrates a DFTS interferometer 200 according to the invention, that includes an optional metrology detector for determining the path difference x. Two light beams enter the DFTS interferometer, one from the source to be measured ("science light") and the other from the laser metrology system ("metrology light"). Laser light from the metrology laser is split into two beams with orthogonal polarizations at BSC1. The two beams are frequency shifted (AOMs), recombined (BSC2), and spatially filtered and expanded (SPF) to the same size as the science light beam. Part of the recombined beam is split from the main beam (B), both orthogonal polarizations are mixed at the polarizer (P1) and focused onto a reference detector (D1). Light from the source to be measured enters the spectrometer through a polarizer (P3). Polarized science light is combined with metrology light at the notch filter (N1). The combined beam is split into two by a polarizing beamsplitter (BSC3). Each beam propagates through DL1 or DL2. The beams are recombined at a polarizing beamsplitter (BSC4). The metrology light is separated from the combined light using a notch filter (N2), the orthogonal polarizations are mixed with a polarizer (P2) and sent to the metrology detector (D2). The intensity measured at D2 is compared with that measured at D1 to generate the metrology signal. At this point, a conventional FTS would focus the light transmitted through N2 to a detector. Instead, with the DFTS interferometer, the light is sent to a dispersing spectrometer as shown. The two polarizations are separated with a Wollaston prism (W), dispersed with a transmission grating (G), and are each focused onto a row of pixels on the CCD 112. The data in the form of interferogram intensities, $I_d$, measured at a set of discrete lags, $x_i$, where $1 \leq i \leq N$, is recorded on the CCD 112 with a computer.

The DFTS interferometer in a preferred embodiment utilizes the concept that the interferogram obtained may be "undersampled" as compared to the sampling required using a conventional FTS. According to the Nyquist Theorem, a FTS must be sampled at increments δx of the path difference A–B such that $\delta x = 1/(2\Delta s)$, where $\Delta s = s_{max} - s_{min}$ is the width in wavenumbers of the spectral region being observed. (For a given wavelength λ, the wavenumber s is 1/λ.)

As an example, with a standard FTS the wavenumber range $\Delta s_{std}$ is large, so the sampling interval $\delta x_{std}$ is small. The DFTS interferometer, however, functions as $R_g$ standard FTSs working in parallel (where $R_g$ is the number of spectral channels in the dispersing spectrometer), each working in a narrow band. The sampling interval $\delta x_g$ for these narrow-band FTSs is $1/(2\Delta s_g)$, where $\Delta s_g$ is the wavenumber range of a single channel. Because the channels are $1/R_g$ as wide as the bandpass of the standard FTS, $\Delta s_g = \Delta s_{std}/R_g$, and the sampling interval $\delta x_g$ is $R_g$ times larger than $\delta x_{std}$. Therefore, the number of sampled points needed to attain a given resolution is reduced by a factor of up to $R_g$ for each channel. Also, conventional FTS data processing techniques involve converting an interferogram into a spectrum using a Fourier transform, after which corrections are applied for sampling to result in a final spectrum. The DFTS technique instead applies an algorithm for inferring the best spectrum given a bandwidth limited interferogram.

The algorithm is preferably applied as either (1) a fast algorithm for solving the best spectrum assuming that the location of the central fringe for each channel is known, or (2) a slow algorithm, for solving the best spectrum as well as the best location for the central fringe. In both approaches, the data consist of interferogram intensities, $I_d$, measured at a set of discrete lags, $x_i$, where $1 \leq i \leq N$. Apart from a constant, which can be ignored in this analysis, the interferogram is simply the inverse cosine transform of the spectrum. Therefore, the data can be written as:

$$I_d(x_i) = \int_{s_{min}}^{s_{max}} ds\, J_t(s)\cos(2\pi x_i s), \quad (9)$$

where $J_t(s)$ is the spectral intensity at wavenumber s. The subscript t indicates that $J_t(s)$ is the truth spectrum, and is not known to the observers. It is then desired to infer $J_t(s)$ based on observations of $I_d(x_i)$.

At this point, there are two significant departures from conventional approaches. The first is that the forward problem is solved. The forward problem is the process of selecting the set of spectral intensities, $J_m(s_j)$, which yields an interferogram $I_m(x_i)$ that best matches $I_d(x_i)$. This is the opposite of the standard strategy of solving the backwards problem by doing a deconvolution of $I_d(x_i)$ in the hopes of disentangling the real signal from the deleterious effect of sampling, noise, etc., and recovering $J_t(s_j)$.

The second departure from conventional methodologies is that a model spectrum having continuous frequency coverage is selected. Conventional methods apply Fourier Transforms to discretely sampled data and return discrete data. The results from conventional methods are diminished in quality due to the lack of knowledge between sampled frequencies. The method presented here alleviates this problem to first order.

Initially, one starts by guessing a set of M spectral intensities, $J_m(s_j)$, which span a wavenumber range defined by the edge wavenumbers of a single, narrowband spectral channel. It is known that the light outside this wavenumber range has been excluded from the detector by the conventional spectrometer in the FTS optical train. Furthermore, it can be assumed that the continuous spectral intensities between $s_j$ and $s_{j+1}$ are given by the interpolation between $J_m(s_j)$ and $J_m(s_{j+1})$.

This choice of $J_m(s_j)$ and the assumptions above result in an interferogram given by:

$$I_m(x_i) = \sum_{j=1}^{M-1} \int_{s_j}^{s_{j+1}} ds [J_m(s_j) + (s-s_j)\Delta_j] \cos(2\pi x_i s), \quad (10)$$

where:

$$\Delta_j = \left[ \frac{J_m(s_{j+1}) - J_m(s_j)}{s_{j+1} - s_j} \right]. \quad (11)$$

and $\epsilon$ is the location of the central fringe in the interferogram. The integral can be evaluated analytically, reducing the expression to:

$$I_m(x_i) = \sum_{j=1}^{M-1} [\alpha_{i,j} J_m(s_j) + \Delta_j \beta_{i,j}], \quad (12)$$

where:

$$\alpha_{i,j} = \left[ \frac{\sin(2\pi x_i s_{j+1}) - \sin(2\pi x_i s_j)}{2\pi x_i} \right], \quad (13)$$

and $$\beta_{i,j} = \left[ \frac{(s_{j+1} - s_j)\sin(2\pi x_i s_{j+1})}{2\pi x_i} \right] + \left[ \frac{\cos(2\pi x_i s_{j+1}) - \cos(2\pi x_i s_j)}{(2\pi x_i)^2} \right] \quad (14)$$

In the fast algorithm technique, the variance of the residuals between the model interferogram and the data interferogram is given by:

$$\chi^2 = \frac{1}{n} \sum_{i=1}^{n} [I_m(x_i) - I_d(x_i)]^2. \quad (15)$$

Above, when describing the forward problem, it is desired to obtain a model interferogram best matched to the data interferogram. This condition can be expressed as a set of equations:

$$\frac{\partial \chi^2}{\partial J_m(s_j)} = \frac{2}{n} \sum_{i=1}^{n} [I_m(x_i) - I_d(x_i)] \left( \frac{\partial I_m(x_i)}{\partial J_m(s_j)} \right) = 0. \quad (16)$$

To complete the problem requires the Jacobian, which can be derived analytically.

$$\left( \frac{\partial I_m(x_i)}{\partial J_m(s_j)} \right) = \alpha_{i,1} - \left( \frac{\beta_{i,1}}{s_2 - s_1} \right) \text{ for } j = 1, \quad (17)$$

$$\left( \frac{\partial I_m(x_i)}{\partial J_m(s_j)} \right) = \left( \frac{\beta_{i,j-1}}{s_j - s_{j-1}} \right) + \alpha_{i,j} - \left( \frac{\beta_{i,j}}{s_{j+1} - s_j} \right) \quad (18)$$
$$\text{for } 2 \leq j \leq M-1,$$

$$\left( \frac{\partial I_m(x_i)}{\partial J_m(s_j)} \right) = \left( \frac{\beta_{i,M-1}}{s_M - s_{M-1}} \right) \text{ for } j = M. \quad (19)$$

The slow algorithm technique also starts with the expression for Equation 15. Equation 16 is still valid, and in addition:

$$\frac{\partial(\chi^2)}{\partial \epsilon} = \frac{2}{n} \sum_{i=1}^{n} [I_m(x_i - \epsilon) - I_d(x_i)] \left( \frac{\partial I_m(x_i - \epsilon)}{\partial \epsilon} \right) = 0 \quad (20)$$

The Jacobian is given by Equations 17–19 and:

$$\frac{\partial I_m(x_i - \epsilon)}{\partial \epsilon} = \frac{1}{x_i - \epsilon} \sum_{j=1}^{M-1} (A_{i,j} J_m(s_j) + B_{i,j} \Delta_j), \text{ where:} \quad (21)$$

$$A_{i,j} = -s_{j+1} \cos(z_i s_{j+1}) + s_j \cos(z_i s_j) + \quad (22)$$
$$\frac{\sin(z_i s_{j+1})}{z_i} - \frac{\sin(z_i s_j)}{z_i},$$

and:

$$B_{i,j} = s_j s_{j+1} \cos(z_i s_{j+1}) + (2s_{j+1} - s_j) \frac{\sin(z_i s_{j+1})}{z_i} - \quad (23)$$
$$s_j \frac{\sin(z_i s_j)}{z_i} - s_{j+1}^2 \cos(z_i s_{j+1}) + \frac{2\cos(z_i s_{j+1})}{z_i^2} - \frac{2\cos(z_i s_j)}{z_i^2},$$

We have used the definition $z_i = 2\pi(x_i - \epsilon)$.

Accordingly, with the spectral reconstruction algorithm described above, a model spectrum is first selected, resulting in a model interferogram. The model spectrum is then varied to yield a model interferogram that most closely matches the data interferogram in a least-squares sense, a method that may be implemented using a simple Newton technique.

Figure 4:
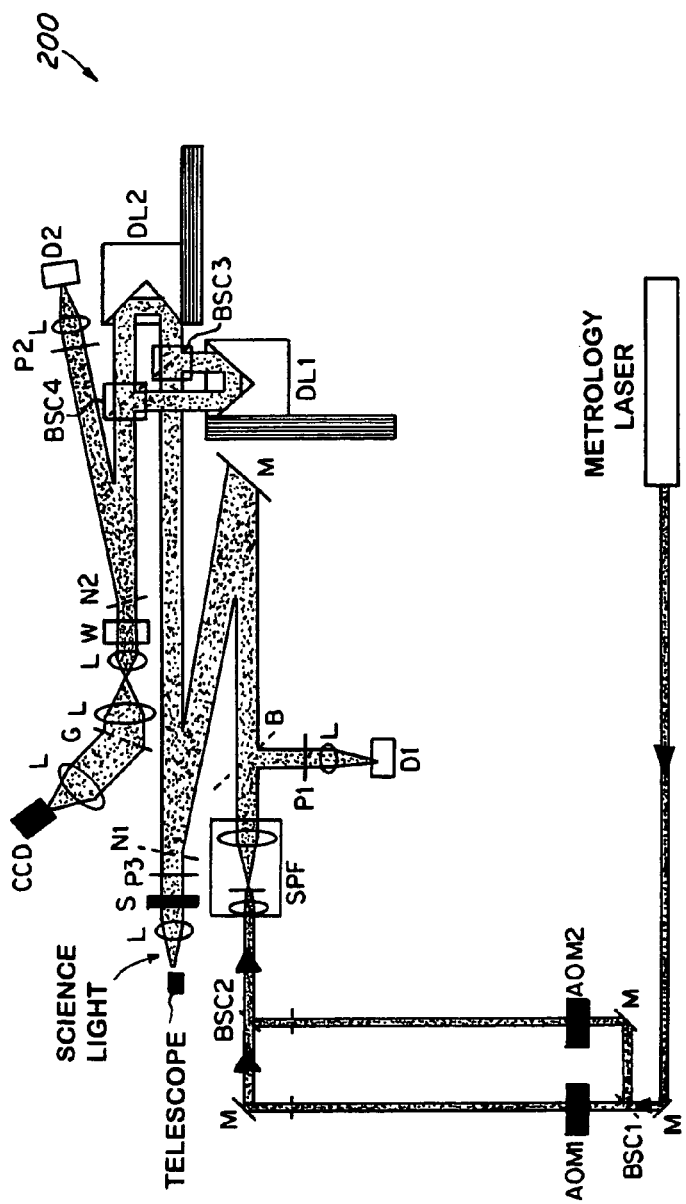
FIG. 4 is a spectrum showing a representative FFT applied to a sparsely sampled interferogram.
Figure 5:
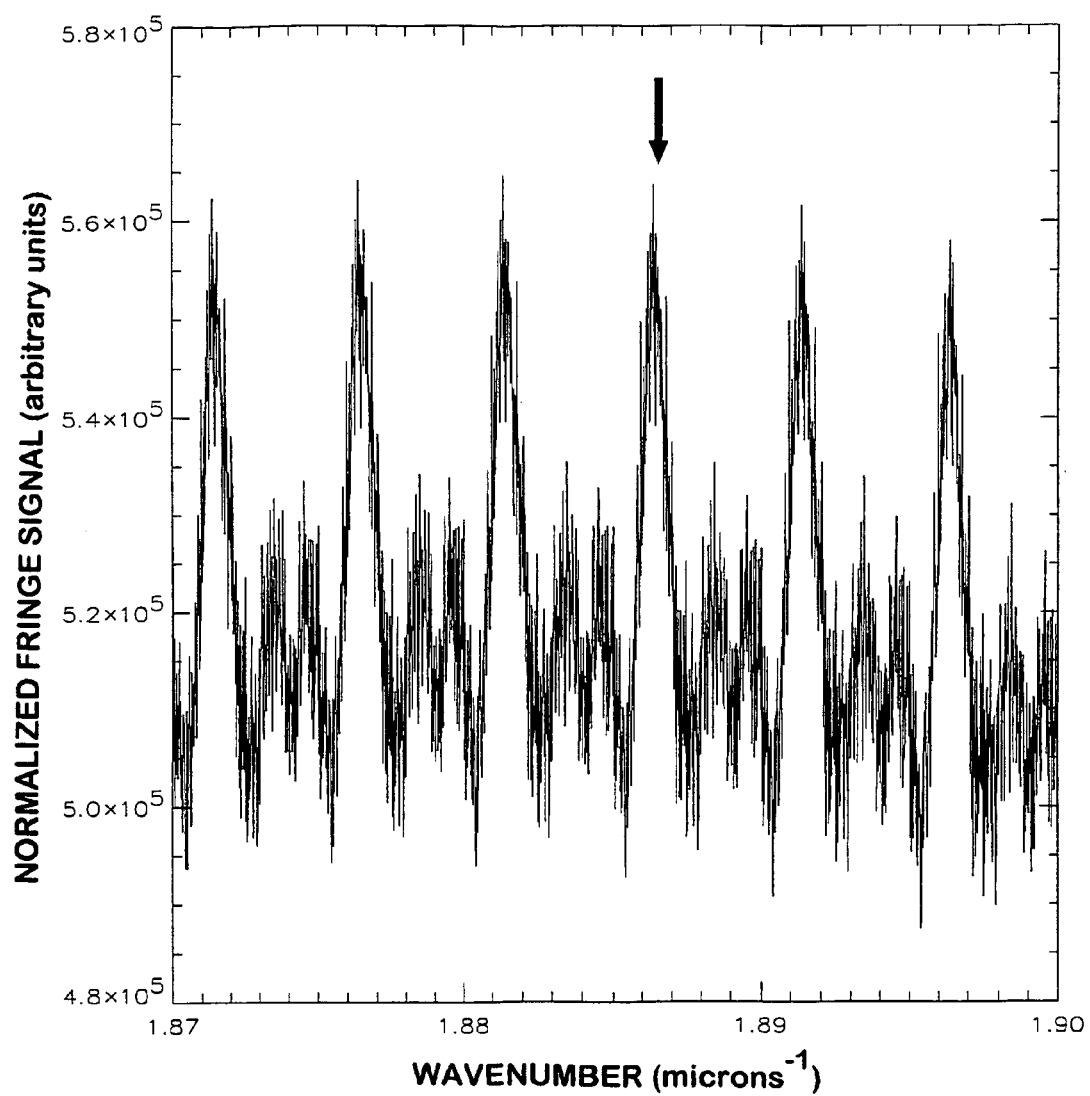
FIG. 5 is a spectrum showing the results of applying the SSA to the same dataset as in FIG. 4 according to the invention.

The algorithm functions primarily as an anti-aliasing filter, replacing the traditional Fast Fourier transform (FFT) for our application. The spectrum resulting from a sparsely sampled interferogram consists of the "true" spectrum plus an "aliased" version of the spectrum shifted to other wavelengths. So long as the sampling interval in the interferogram satisfies the Nyquist Theorem, the aliases will not overlap the "true" spectrum. The algorithm infers the spectral intensities only over a user-defined bandwidth of interest (presumably containing the "real" signal and not one of the aliases). These effects are illustrated in FIG. 4, which shows the results of applying a FFT to a sparsely sampled interferogram. The real spectrum (denoted by the arrow) is aliased at all frequencies. As the sampling in the interferogram approaches the Nyquist Limit, that is becomes sparser, the aliased peaks merge. FIG. 5 shows the results of applying the algorithm according to the invention for the same dataset as used with the FFT in generating FIG. 5. It is evident from comparing the figures that the sparse reconstruction algorithm serves as an anti-aliasing filter, and more efficiently reconstructs the actual signal than does the FFT. The spectrum outside this interval is zero.

The DFTS interferometer of the invention is an achromatic device in that it can obtain spectra from a luminous source at any given wavelengths throughout the electromagnetic spectrum, so long as the optical components and detectors are selected so as to provide reasonable sensitivity. Obviously many other modifications and variations of the present invention are possible in the light of the above teachings. It is therefore to be understood that the scope of the invention should be determined by referring to the following appended claims.

The invention claimed is:

1. A dispersing Fourier Transform interferometer, comprising:
   a Fourier Transform Spectrometer having an input for receiving a source light and an output;
   a dispersive element having an input coupled to the Fourier Transform Spectrometer output and an output for providing the resulting multiple narrowband interferogram outputs of different wavelengths representative of the source light input; and
   a metrology system configured for measuring optical path lengths internal to the interferometer.

2. An interferometer as in claim 1, further comprising:
   a sensor including a plurality of light intensity sensing elements each separately responsive to said different wavelengths for producing a set of data of interferogram intensities $I_d$ measured at a set of discrete lags $x_i$; and
   a processor for receiving and processing the data to produce a spectral output having a best fit with the set of data.

3. An interferometer as in claim 2, wherein the processor includes a sparse sampling algorithm for determining the best fit between a set of model interferograms and said set of data interferograms.

4. An interferometer as in claim 3, wherein the sparse sampling algorithm comprises:
   processing the set of data interferograms, $I_d(x_i)$, where:

$$I_d(x_i) = \int_{s_{min}}^{s_{max}} ds\, J_t(s) \cos(2\pi x_i s),$$

and where s is the wavenumber, equal to the inverse of the wavelength, $J_t(s)$ is the true spectral intensity at wavenumber s, and the subscript t indicates that $J_t(s)$ is the truth spectrum and is an unknown, and the wavenumbers $s_{min}(n)$ and $s_{max}(n)$ span the range of wavenumbers detected by the $n^{th}$ member of said set of light intensity sensing elements;
   choosing a model spectrum, $J_m(s_j)$, from which is inferred a model interferogram specified at a discrete set of lags $x_i$, $I_m(x_i)$ and
   determining a difference between said model interferogram and said data interferogram and applying an optimization method to determine a model interferogram best matched to the data interferogram $I_d(x_i)$.

5. An interferometer as in claim 4, wherein the optimization method comprises:
   establishing a model interferogram given by:

$$I_m(x_i) = \sum_{j=1}^{M-1} \int_{s_j}^{s_{j+1}} ds\, [J_m(s_j) + (s-s_j)\Delta_j]\cos(2\pi x_i s),$$

where:

$$\Delta_j = \left[\frac{J_m(s_{j+1}) - J_m(s_j)}{s_{j+1} - s_j}\right].$$

and $\epsilon$ is the location of a central fringe in the model interferogram, which reduces to:

$$I_m(x_i) = \sum_{j=1}^{M-1} [\alpha_{i,j} J_m(s_j) + \Delta_j \beta_{i,j}], \text{ where:}$$

$$\alpha_{i,j} = \left[\frac{\sin(2\pi x_i s_{j+1}) - \sin(2\pi x_i s_j)}{2\pi x_i}\right], \text{ and}$$

$$\beta_{i,j} = \left[\frac{(s_{j+1} - s_j)\sin(2\pi x_i s_{j+1})}{2\pi x_i}\right] + \left[\frac{\cos(2\pi x_i s_{j+1}) - \cos(2\pi x_i s_j)}{(2\pi x_i)^2}\right]$$

setting a variance of the residuals between the model interferogram and the data interferogram according to the equation:

$$\chi^2 = \frac{1}{n}\sum_{n=1}^{n} [I_m(x_i) - I_d(x_i)]^2$$

and
   obtaining a model interferogram best matched to the data interferogram according to the equations:

$$\frac{\partial \chi^2}{\partial J_m(s_j)} = \frac{2}{n}\sum_{i=1}^{n}[I_m(x_i) - I_d(x_i)]\left(\frac{\partial I_m(x_i)}{\partial J_m(s_j)}\right) = 0$$

$$\left(\frac{\partial I_m(x_i)}{\partial J_m(s_j)}\right) = \alpha_{i,1} - \left(\frac{\beta_{i,1}}{s_2 - s_1}\right) \text{ for } j = 1,$$

$$\left(\frac{\partial I_m(x_i)}{\partial J_m(s_j)}\right) = \left(\frac{\beta_{i,j-1}}{s_j - s_{j-1}}\right) + \alpha_{i,j} - \left(\frac{\beta_{i,j}}{s_{j+1} - s_j}\right) \text{ for } 2 \leq j \leq M-1,$$

$$\left(\frac{\partial I_m(x_i)}{\partial J_m(s_j)}\right) = \left(\frac{\beta_{i,M-1}}{s_M - s_{M-1}}\right) \text{ for } j = M.$$

6. An interferometer as in claim 4, wherein the optimization method comprises: establishing a model interferogram given by:

$$I_m(x_i) = \sum_{j=1}^{M-1} \int_{s_j}^{s_{j+1}} ds\, [J_m(s_j) + (s-s_j)\Delta_j]\cos(2\pi x_i s), \text{ where:}$$

$$\Delta_j = \left[\frac{J_m(s_{j+1}) - J_m(s_j)}{s_{j+1} - s_j}\right]$$

and $\epsilon$ is the location of a central fringe in the model interferogram, which reduces to:

$$I_m(x_i) = \sum_{j=1}^{M-1} [\alpha_{i,j} J_m(s_j) + \Delta_j \beta_{i,j}],$$

where:

$$\alpha_{i,j} = \left[\frac{\sin(2\pi x_i s_{j+1}) - \sin(2\pi x_i s_j)}{2\pi x_i}\right],$$

and $$\beta_{i,j} = \left[\frac{(s_{j+1} - s_j)\sin(2\pi x_i s_{j+1})}{2\pi x_i}\right] + \left[\frac{\cos(2\pi x_i s_{j+1}) - \cos(2\pi x_i s_j)}{(2\pi x_i)^2}\right]$$

setting a variance of the residuals between the model interferogram and the data interferogram according to the equation:

$$\chi^2 = \frac{1}{n}\sum_{i=1}^{n}[I_m(x_i) - I_d(x_i)]^2$$

and obtaining a model interferogram best matched to the data interferogram according to the equations:

$$\frac{\partial \chi^2}{\partial J_m(s_j)} = \frac{2}{n}\sum_{i=1}^{n}[I_m(x_i) - I_d(x_i)]\left(\frac{\partial I_m(x_i)}{\partial J_m(s_j)}\right) = 0$$

$$\frac{\partial(\chi^2)}{\partial \epsilon} = \frac{2}{n}\sum_{i=1}^{n}[I_m(x_i - \epsilon) - I_d(x_i)]\left(\frac{\partial I_m(x_i - \epsilon)}{\partial \epsilon}\right) = 0,$$

and $$\frac{\partial I_m(x_i - \epsilon)}{\partial \epsilon} = \frac{1}{x_i - \epsilon}\sum_{j=1}^{M-1}(A_{i,j}J_m(s_j) + B_{i,j}\Delta_j),$$

where:

$$A_{i,j} = -s_{j+1}\cos(z_i s_{j+1}) + s_j\cos(z_i s_j) + \frac{\sin(z_i s_{j+1})}{z_i} - \frac{\sin(z_i s_j)}{z_i},$$

and $$B_{i,j} = s_j s_{j+1}\cos(z_i s_{j+1}) + (2s_{j+1} - s_j)\frac{\sin(z_i s_{j+1})}{z_i} - s_j\frac{\sin(z_i s_j)}{z_i} -$$
$$s_{j+1}^2\cos(z_i s_{j+1}) + \frac{2\cos(z_i s_{j+1})}{z_i^2} - \frac{2\cos(z_i s_j)}{z_i^2},$$

where $z_i = 2\pi(x_i - \epsilon)$.

7. An interferometer as in claim 2, wherein the source light is an astronomical emission.

8. An interferometer as in claim 2, wherein the source light is emitted from a material upon induction of the material into an excited state.

9. An interferometer as in claim 2, wherein the material is an unknown compound subjected to testing to determine the presence of possible biologically or chemically hazardous properties.

10. As interferometer as in claim 1, wherein the Fourier Transform Spectrometer comprises:
   optics for receiving and collimating a source light along a first optical path;
   a beamsplitter positioned for splitting the collimated source light into a second light beam along a second optical path differing from said first optical path;
   a first reflector positioned along said first optical path for reflecting light transmitted through said beamsplitter back toward a beamsplitter;
   a second reflector positioned along said second optical path for reflecting said second light beam back toward a beamsplitter;
   and wherein the interferometer further comprises:
   a sensor including a plurality of light intensity sensing elements each separately responsive to said different wavelengths for producing a set of data of interferogram intensities $I_d$ measured at a set of discrete lags $x_i$; and
   a processor for receiving and processing the data to produce a spectral output having a best fit with the set of data.

11. An interferometer as in claim 10, wherein the processor includes a sparse sampling algorithm for determining the best fit between a set of model interferograms and said set of data interferograms.

12. An interferometer as in claim 11, wherein the sparse sampling algorithm comprises:
   processing the set of data interferograms, $I_d(x_i)$, where:

$$I_d(x_i) = \int_{s_{min}}^{s_{max}} ds\, J_t(s)\cos(2\pi x_i s),$$

and where s is the wavenumber, equal to the inverse of the wavelength, $J_t(s)$ is the true spectral intensity at wavenumber s, and the subscripted t indicates that $J_t(s)$ is the truth spectrum and is an unknown, and the wavenumbers $s_{min}(n)$ and $s_{max}(n)$ span the range of wavenumbers detected by the $n^{th}$ member of said set of light intensity sensing elements;
   creating a continuous function $J_m(s)$ that is equal to $J_m(s_i)$ at each value $s_i$, from which is inferred the model interferogram specified at a discrete set of lags $x_i$, $I_m(x_i)$; and
   determining the difference between said model interferogram and said data interferogram and applying an optimization method to determine a model interferogram best matched to the data interferogram $I_d(x_i)$.

13. An interferometer as in claim 12, wherein the optimization method comprises:
   establishing a model interferogram given by:

$$I_m(x_i) = \sum_{j=1}^{M-1} \int_{s_j}^{s_{j+1}} ds[J_m(s_j) + (s - s_j)\Delta_j]\cos(2\pi x_i s),$$

where:

$$\Delta_j = \left[\frac{J_m(s_{j+1}) - J_m(s_j)}{s_{j+1} - s_j}\right]$$

and $\epsilon$ is the location of a central fringe in the model interferogram, which reduces to:

$$I_m(x_i) = \sum_{j=1}^{M-1} [\alpha_{i,j} J_m(s_j) + \Delta_j \beta_{i,j}],$$

where:

$$\alpha_{i,j} = \left[\frac{\sin(2\pi x_i s_{j+1}) - \sin(2\pi x_i s_j)}{2\pi x_i}\right],$$

-continued and $$\beta_{i,j} = \left[\frac{(s_{j+1} - s_j)\sin(2\pi x_i s_{j+1})}{2\pi x_i}\right] + \left[\frac{\cos(2\pi x_i s_{j+1}) - \cos(2\pi x_i s_j)}{(2\pi x_i)^2}\right]$$

setting a variance of the residuals between the model interferogram and the data interferogram according to the equation:

$$\chi^2 = \frac{1}{n}\sum_{i=1}^{n}[I_m(x_i) - I_d(x_i)]^2$$

and obtaining a model interferogram best matched to the data interferogram according to the equations:

$$\frac{\partial \chi^2}{\partial J_m(s_j)} = \frac{2}{n}\sum_{i=1}^{n}[I_m(x_i) - I_d(x_i)]\left(\frac{\partial I_m(x_i)}{\partial J_m(s_j)}\right) = 0$$

$$\left(\frac{\partial I_m(x_i)}{\partial J_m(s_j)}\right) = \alpha_{i,1} - \left(\frac{\beta_{i,1}}{s_2 - s_1}\right) \text{ for } j = 1,$$

$$\left(\frac{\partial I_m(x_i)}{\partial J_m(s_j)}\right) = \left(\frac{\beta_{i,j-1}}{s_j - s_{j-1}}\right) + \alpha_{i,j} - \left(\frac{\beta_{i,j}}{s_{j+1} - s_j}\right) \text{ for } 2 \le j \le M - 1,$$

and $$\left(\frac{\partial I_m(x_i)}{\partial J_m(s_j)}\right) = \left(\frac{\beta_{i,M-1}}{s_M - s_{M-1}}\right) \text{ for } j = M.$$

14. An interferometer as in claim 12, wherein the optimization method comprises: establishing a model interferogram given by:

$$I_m(x_i) = \sum_{j=1}^{M-1}\int_{s_j}^{s_{j+1}} ds[J_m(s_j) + (s - s_j)\Delta_j]\cos(2\pi x_i s),$$

where:

$$\Delta_j = \left[\frac{J_m(s_{j+1}) - J_m(s_j)}{s_{j+1} - s_j}\right]$$

and $\epsilon$ is the location of a central fringe in the model interferogram, which reduces to:

$$I_m(x_i) = \sum_{j=1}^{M-1}[\alpha_{i,j}J_m(s_j) + \Delta_j\beta_{i,j}],$$

where:

$$\alpha_{i,j} = \left[\frac{\sin(2\pi x_i s_{j+1}) - \sin(2\pi x_i s_j)}{2\pi x_i}\right],$$

and $$\beta_{i,j} = \left[\frac{(s_{j+1} - s_j)\sin(2\pi x_i s_{j+1})}{2\pi x_i}\right] + \left[\frac{\cos(2\pi x_i s_{j+1}) - \cos(2\pi x_i s_j)}{(2\pi x_i)^2}\right]$$

setting a variance of the residuals between the model interferogram and the data interferogram according to the equation:

$$\chi^2 = \frac{1}{n}\sum_{i=1}^{n}[I_m(x_i) - I_d(x_i)]^2$$

and obtaining a model interferogram best matched to the data interferogram according to the equations:

$$\frac{\partial \chi^2}{\partial J_m(s_j)} = \frac{2}{n}\sum_{i=1}^{n}[I_m(x_i) - I_d(x_i)]\left(\frac{\partial I_m(x_i)}{\partial J_m(s_j)}\right) = 0$$

$$\frac{\partial(\chi^2)}{\partial \epsilon} = \frac{2}{n}\sum_{i=1}^{n}[I_m(x_i - \epsilon) - I_d(x_i)]\left(\frac{\partial I_m(x_i - \epsilon)}{\partial \epsilon}\right) = 0,$$

and $$\left(\frac{\partial I_m(x_i)}{\partial J_m(s_j)}\right) = \alpha_{i,1} - \left(\frac{\beta_{i,1}}{s_2 - s_1}\right) \text{ for } j = 1,$$

$$\left(\frac{\partial I_m(x_i)}{\partial J_m(s_j)}\right) = \left(\frac{\beta_{i,j-1}}{s_j - s_{j-1}}\right) + \alpha_{i,j} - \left(\frac{\beta_{i,j}}{s_{j+1} - s_j}\right) \text{ for } 2 \le j \le M - 1,$$

and $$\left(\frac{\partial I_m(x_i)}{\partial J_m(s_j)}\right) = \alpha_{i,1} - \left(\frac{\beta_{i,M-1}}{s_M - s_{M-1}}\right) \text{ for } j = M$$

and:

$$\frac{\partial I_m(x_i - \epsilon)}{\partial \epsilon} = \frac{1}{x_i - \epsilon}\sum_{j=1}^{M-1}(A_{i,j}J_m(s_j) + B_{i,j}\Delta_j),$$

where:

$$A_{i,j} = -s_{j+1}\cos(z_i s_{j+1}) + s_j \cos(z_i s_j) + \frac{\sin(z_i s_{j+1})}{z_i} - \frac{\sin(z_i s_j)}{z_i},$$

and $$B_{i,j} = s_j s_{j+1}\cos(z_i s_{j+1}) + (2s_{j+1} - s_j)\frac{\sin(z_i s_{j+1})}{z_i} - $$

$$s_j \frac{\sin(z_i s_j)}{z_i} - s_{j+1}^2\cos(z_i s_{j+1}) + \frac{2\cos(z_i s_{j+1})}{z_i^2} - \frac{2\cos(z_i s_j)}{z_i^2},$$

where $z_i = 2\pi(x_i - \varepsilon)$.

15. An interferometer as in claim 10, wherein the source light is an astronomical emission.

16. An interferometer as in claim 10, wherein the source light is emitted from a material upon induction of the material into an excited state.

17. An interferometer as in claim 10, wherein the material is an unknown compound subjected to testing to determine the presence of possible biologically or chemically hazardous properties.

18. A dispersing Fourier Transform interferometer, comprising:
  optics for receiving and collimating a source light along a first optical path;
  a beamsplitter positioned for splitting the collimated source light into a second light beam along a second optical path substantially orthogonal to said first optical path;
  a first reflector positioned along said first optical path for reflecting light transmitted through said beamsplitter back toward said beamsplitter;
  a second reflector positioned along said second optical path for reflecting said second light beam back toward said beamsplitter;

a programmable drive-train coupled to at least one of said first and second reflectors for moving said coupled reflector along its associated optical path so as to introduce a variable path difference x between said first and second optical paths whereby said source light and said second light beam recombine at said beamsplitter and are recorded on a multielement detector at a variety of delays, comprising an interferogram;

a metrology detector for directly and precisely measuring the path length difference between the two reflectors;

a dispersive element positioned along said second optical path for receiving a Fourier Transform Spectrometer output and for providing a resulting multiple narrow-band interferogram outputs of different wavelengths representative of the source light input;

a sensor including a plurality of light intensity sensing elements each separately responsive to said different wavelengths for producing a set of data of interferogram intensities $I_d$ measured at a set of discrete lags $x_i$; and a processor for receiving and processing the data to produce a spectral output having a best fit with the set of data.

19. An interferometer as in claim 18, wherein the processor includes a sparse sampling algorithm for determining the best fit between a model interferogram and the data interferogram.

20. An interferometer as in claim 19, wherein the sparse sampling algorithm comprises:

processing the set of data interferograms, $I_d(x_i)$, where:

$$I_d(x_i) = \int_{s_{min}}^{s_{max}} ds \, J_t(s) \cos(2\pi x_i s),$$

and where s is the wavenumber, equal to the inverse of the wavelength, $J_t(s)$ is the true spectral intensity at wavenumber s, and the subscript t indicates that $J_t(s)$ is the truth spectrum and is an unknown, and the wavenumbers $s_{min}(n)$ and $s_{max}(n)$ span the range of wavenumbers detected by the $n^{th}$ member of said set of light intensity sensing elements;

choosing a model spectrum, $J_m(s_j)$, from which is inferred a model interferogram specified at a discrete set of lags $x_i$, $I_m(x_i)$; and determining a difference between said model interferogram and said data interferogram and applying an optimization method to determine a model interferogram best matched to the data interferogram $I_d(x_i)$.

21. An interferometer as in claim 20, wherein the optimization method comprises:

establishing a model interferogram given by:

$$I_m(x_i) = \sum_{j=1}^{M-1} \int_{s_j}^{s_{j+1}} ds [J_m(s_j) + (s-s_j)\Delta_j] \cos(2\pi x_i s),$$

where:

$$\Delta_j = \left[\frac{J_m(s_{j+1}) - J_m(s_j)}{s_{j+1} - s_j}\right]$$

and $\epsilon$ is the location of a central fringe in the model interferogram, which reduces to:

$$I_m(x_i) = \sum_{j=1}^{M-1} [\alpha_{i,j} J_m(s_j) + \Delta_j \beta_{i,j}],$$

where:

$$\alpha_{i,j} = \left[\frac{\sin(2\pi x_i s_{j+1}) - \sin(2\pi x_i s_j)}{2\pi x_i}\right],$$

and $$\beta_{i,j} = \left[\frac{(s_{j+1} - s_j)\sin(2\pi x_i s_{j+1})}{2\pi x_i}\right] + \left[\frac{\cos(2\pi x_i s_{j+1}) - \cos(2\pi x_i s_j)}{(2\pi x_i)^2}\right]$$

setting a variance of the residuals between the model interferogram and the data interferogram according to the equation:

$$\chi^2 = \frac{1}{n} \sum_{i=1}^{n} [I_m(x_i) - I_d(x_i)]^2$$

and obtaining a model interferogram best matched to the data interferogram according to the equations:

$$\frac{\partial \chi^2}{\partial J_m(s_j)} = \frac{2}{n} \sum_{i=1}^{n} [I_m(x_i) - I_d(x_i)] \left(\frac{\partial I_m(x_i)}{\partial J_m(s_j)}\right) = 0$$

$$\left(\frac{\partial I_m(x_i)}{\partial J_m(s_j)}\right) = \alpha_{i,1} - \left(\frac{\beta_{i,1}}{s_2 - s_1}\right) \text{ for } j = 1,$$

$$\left(\frac{\partial I_m(x_i)}{\partial J_m(s_j)}\right) = \left(\frac{\beta_{i,j-1}}{s_j - s_{j-1}}\right) + \alpha_{i,j} - \left(\frac{\beta_{i,j}}{s_{j+1} - s_j}\right) \text{ for } 2 \leq j \leq M-1,$$

and $$\left(\frac{\partial I_m(x_i)}{\partial J_m(s_j)}\right) = \left(\frac{\beta_{i,M-1}}{s_M - s_{M-1}}\right) \text{ for } j = M.$$

22. An interferometer as in claim 20, wherein the optimization method comprises: establishing a model interferogram given by:

$$I_m(x_i) = \sum_{j=1}^{M-1} \int_{s_j}^{s_{j+1}} ds [J_m(s_j) + (s-s_j)\Delta_j] \cos(2\pi x_i s),$$

where:

$$\Delta_j = \left[\frac{J_m(s_{j+1}) - J_m(s_j)}{s_{j+1} - s_j}\right]$$

and $\epsilon$ is the location of a central fringe in the model interferogram, which reduces to:

$$I_m(x_i) = \sum_{j=1}^{M-1} [\alpha_{i,j} J_m(s_j) + \Delta_j \beta_{i,j}],$$

where:

$$\alpha_{i,j} = \left[\frac{\sin(2\pi x_i s_{j+1}) - \sin(2\pi x_i s_j)}{2\pi x_i}\right],$$

and

-continued $$\beta_{i,j} = \left[\frac{(s_{j+1} - s_j)\sin(2\pi x_i s_{j+1})}{2\pi x_i}\right] + \left[\frac{\cos(2\pi x_i s_{j+1}) - \cos(2\pi x_i s_j)}{(2\pi x_i)^2}\right]$$

setting a variance of the residuals between the model interferogram and the data interferogram according to the equation:

$$\chi^2 = \frac{1}{n}\sum_{i=1}^{n}[I_m(x_i - \epsilon) - I_d(x_i)]^2.$$

and obtaining a model interferogram best matched to the data interferogram according to the equations:

$$\frac{\partial \chi^2}{\partial J_m(s_j)} = \frac{2}{n}\sum_{i=1}^{n}[I_m(x_i) - I_d(x_i)]\left(\frac{\partial I_m(x_i)}{\partial J_m(s_j)}\right) = 0$$

$$\frac{\partial (\chi^2)}{\partial \epsilon} = \frac{2}{n}\sum_{i=1}^{n}[I_m(x_i - \epsilon) - I_d(x_i)]\left(\frac{\partial I_m(x_i - \epsilon)}{\partial \epsilon}\right) = 0,$$

and $$\left(\frac{\partial I_m(x_i)}{\partial J_m(s_j)}\right) = \alpha_{i,1} - \left(\frac{\beta_{i,1}}{s_2 - s_1}\right) \text{ for } j = 1,$$

$$\left(\frac{\partial I_m(x_i)}{\partial J_m(s_j)}\right) = \left(\frac{\beta_{i,j-1}}{s_j - s_{j-1}}\right) + \alpha_{i,j} - \left(\frac{\beta_{i,j}}{s_{j+1} - s_j}\right) \text{ for } 2 \leq j \leq M - 1,$$

and $$\left(\frac{\partial I_m(x_i)}{\partial J_m(s_j)}\right) = \left(\frac{\beta_{i,M-1}}{s_M - s_{M-1}}\right) \text{ for } j = M$$

and:

$$\frac{\partial I_m(x_i - \epsilon)}{\partial \epsilon} = \frac{1}{x_i - \epsilon}\sum_{j=1}^{M-1}(A_{i,j}J_m(s_j) + B_{i,j}\Delta_j),$$

where:

$$A_{i,j} = -s_{j+1}\cos(z_i s_{j+1}) + s_j\cos(z_i s_j) + \frac{\sin(z_i s_{j+1})}{z_i} - \frac{\sin(z_i s_j)}{z_i},$$

and $$B_{i,j} = s_j s_{j+1}\cos(z_i s_{j+1}) + (2s_{j+1} - s_j)\frac{\sin(z_i s_{j+1})}{z_i} - s_j\frac{\sin(z_i s_j)}{z_i} - s_{j+1}^2\cos(z_i s_{j+1}) + \frac{2\cos(z_i s_{j+1})}{z_i^2} - \frac{2\cos(z_i s_j)}{z_i^2},$$

where $z_i = 2\pi(x_i - \epsilon)$.

23. An interferometer as in claim 20, wherein the source light is an astronomical emission.

24. An interferometer as in claim 20, wherein the source light is emitted from a material upon induction of the material into an excited state.

25. An interferometer as in claim 20, wherein the material is an unknown compound subjected to testing to determine the presence of possible biologically or chemically hazardous properties.

26. A method of determining a spectrum of a light source, comprising:

receiving and collimating a source light along a first optical path;

transmitting a first part of the collimated source light further along said first optical path while reflecting a second part of the collimated source light along a second optical path;

reflecting back said first part of said collimated source light along said first optical path;

reflecting back said second part of said collimated source light along said second optical path;

introducing a path length difference x between said first and second optical paths;

measuring the path difference x with a metrology system;

recombining said back-reflected first and second parts of said collimated source light;

dispersing said recombined light into a plurality of different wavelengths;

separately sensing an intensity I of each of said plurality of different wavelengths to thereby produce a set of data of interferogram intensities $I_d$ measured at a set of discrete lags $x_i$;

processing the data so as to produce a spectral output having a best fit with the set of data; and displaying the data for analysis.

27. A method as in claim 26, wherein the data processing includes applying a sparse sampling algorithm for determining the best fit between a model interferogram and the data interferogram.

28. A method as in claim 27, wherein the sparse sampling algorithm comprises:

processing the set of data interferograms, $I_d(x_i)$, where:

$$I_d(x_i) = \int_{s_{\min}}^{s_{\max}} ds\, J_t(s)\cos(2\pi x_i s),$$

and where s is the wavenumber, equal to the inverse of the wavelength, $J_t(s)$ is the true spectral intensity at wavenumber s, and the subscript t indicates that $J_t(s)$ is the truth spectrum and is an unknown, and the wavenumbers $s_{min}(n)$ and $s_{max}(n)$ span the range of wavenumbers detected by the $n^{th}$ member of said set of light intensity sensing elements;

choosing a model spectrum, $J_m(s_j)$, from which is inferred a model interferogram specified at a discrete set of lags $x_i$, $I_m(x_i)$; and determining a difference between said model interferogram and said data interferogram and applying an optimization method to determine a model interferogram best matched to the data interferogram $I_d(x_i)$.

29. A method as in claim 28, wherein the optimization method comprises:

establishing a model interferogram given by:

$$I_m(x_i) = \sum_{j=1}^{M-1}\int_{s_j}^{s_{j+1}} ds\,[J_m(s_j) + (s - s_j)\Delta_j]\cos(2\pi x_i s),$$

where:

$$\Delta_j = \left[\frac{J_m(s_{j+1}) - J_m(s_j)}{s_{j+1} - s_j}\right]$$

and $\epsilon$ is the location of a central fringe in the model interferogram, which reduces to:

$$I_m(x_i) = \sum_{j=1}^{M-1} [\alpha_{i,j} J_m(s_j) + \Delta_j \beta_{i,j}],$$

where:

$$\alpha_{i,j} = \left[\frac{\sin(2\pi x_i s_{j+1}) - \sin(2\pi x_i s_j)}{2\pi x_i}\right],$$

and $$\beta_{i,j} = \left[\frac{(s_{j+1} - s_j)\sin(2\pi x_i s_{j+1})}{2\pi x_i}\right] + \left[\frac{\cos(2\pi x_i s_{j+1}) - \cos(2\pi x_i s_j)}{(2\pi x_i)^2}\right]$$

setting a variance of the residuals between the model interferogram and the data interferogram according to the equation:

$$\chi^2 = \frac{1}{n}\sum_{i=1}^{n} [I_m(x_i) - I_d(x_i)]^2$$

and obtaining a model interferogram best matched to the data interferogram according to the equations:

$$\frac{\partial \chi^2}{\partial J_m(s_j)} = \frac{2}{n}\sum_{i=1}^{n} [I_m(x_i) - I_d(x_i)]\left(\frac{\partial I_m(x_i)}{\partial J_m(s_j)}\right) = 0$$

$$\left(\frac{\partial I_m(x_i)}{\partial J_m(s_j)}\right) = \alpha_{i,1} - \left(\frac{\beta_{i,1}}{s_2 - s_1}\right) \text{ for } j = 1,$$

$$\left(\frac{\partial I_m(x_i)}{\partial J_m(s_j)}\right) = \left(\frac{\beta_{i,j-1}}{s_j - s_{j-1}}\right) + \alpha_{i,j} - \left(\frac{\beta_{i,j}}{s_{j+1} - s_j}\right) \text{ for } 2 \leq j \leq M-1,$$

and $$\left(\frac{\partial I_m(x_i)}{\partial J_m(s_j)}\right) = \left(\frac{\beta_{i,M-1}}{s_M - s_{M-1}}\right) \text{ for } j = M.$$

30. A method as in claim 28, wherein the optimization method comprises: establishing a model interferogram given by:

$$I_m(x_i) = \sum_{j=1}^{M-1} \int_{s_j}^{s_{j+1}} ds \, [J_m(s_j) + (s - s_j)\Delta_j]\cos(2\pi x_i s),$$

where:

$$\Delta_j = \left[\frac{J_m(s_{j+1}) - J_m(s_j)}{s_{j+1} - s_j}\right]$$

and $\epsilon$ is the location of a central fringe in the model interferogram, which reduces to:

$$I_m(x_i) = \sum_{j=1}^{M-1} [\alpha_{i,j} J_m(s_j) + \Delta_j \beta_{i,j}],$$

where:

$$\alpha_{i,j} = \left[\frac{\sin(2\pi x_i s_{j+1}) - \sin(2\pi x_i s_j)}{2\pi x_i}\right],$$

and $$\beta_{i,j} = \left[\frac{(s_{j+1} - s_j)\sin(2\pi x_i s_{j+1})}{2\pi x_i}\right] + \left[\frac{\cos(2\pi x_i s_{j+1}) - \cos(2\pi x_i s_j)}{(2\pi x_i)^2}\right]$$

setting a variance of the residuals between the model interferogram and the data interferogram according to the equation:

$$\chi^2 = \frac{1}{n}\sum_{i=1}^{n} [I_m(x_i - \epsilon) - I_d(x_i)]^2$$

and obtaining a model interferogram best matched to the data interferogram according to the equations:

$$\frac{\partial \chi^2}{\partial J_m(s_j)} = \frac{2}{n}\sum_{i=1}^{n} [I_m(x_i) - I_d(x_i)]\left(\frac{\partial I_m(x_i)}{\partial J_m(s_j)}\right) = 0$$

$$\frac{\partial (\chi^2)}{\partial \epsilon} = \frac{2}{n}\sum_{i=1}^{n} [I_m(x_i - \epsilon) - I_d(x_i)]\left(\frac{\partial I_m(x_i - \epsilon)}{\partial \epsilon}\right) = 0,$$

and $$\left(\frac{\partial I_m(x_i)}{\partial J_m(s_j)}\right) = \alpha_{i,1} - \left(\frac{\beta_{i,1}}{s_2 - s_1}\right) \text{ for } j = 1,$$

$$\left(\frac{\partial I_m(x_i)}{\partial J_m(s_j)}\right) = \left(\frac{\beta_{i,j-1}}{s_j - s_{j-1}}\right) + \alpha_{i,j} - \left(\frac{\beta_{i,j}}{s_{j+1} - s_j}\right) \text{ for } 2 \leq j \leq M-1,$$

and $$\left(\frac{\partial I_m(x_i)}{\partial J_m(s_j)}\right) = \left(\frac{\beta_{i,M-1}}{s_M - s_{M-1}}\right) \text{ for } j = M$$

and:

$$\frac{\partial I_m(x_i - \varepsilon)}{\partial \epsilon} = \frac{1}{x_i - \epsilon}\sum_{j=1}^{M-1} (A_{i,j} J_m(s_j) + B_{i,j}\Delta_j),$$

where:

$$A_{i,j} = -s_{j+1}\cos(z_i s_{j+1}) + s_j \cos(z_i s_j) + \frac{\sin(z_i s_{j+1})}{z_i} - \frac{\sin(z_i s_j)}{z_i},$$

and $$B_{i,j} = s_j s_{j+1}\cos(z_i s_{j+1}) + (2s_{j+1} - s_j)\frac{\sin(z_i s_{j+1})}{z_i} - s_j \frac{\sin(z_i s_j)}{z_i} -$$
$$s_{j+1}^2 \cos(z_i s_{j+1}) + \frac{2\cos(z_i s_{j+1})}{z_i^2} - \frac{2\cos(z_i s_j)}{z_i^2},$$

where $z_i = 2\pi(x_i - \epsilon)$.

31. A method as in claim 26, wherein the source light is an astronomical emission.

32. A method as in claim 26, wherein the source light is emitted from a material upon induction of the material into an excited state.

33. A method as in claim 26, wherein the material is an unknown compound subjected to testing to determine the presence of possible biologically or chemically hazardous propenies.

* * * * *